United States Patent Office 3,566,623
Patented Mar. 2, 1971

3,566,623
PROGRAMMING CONTROL SYSTEM FOR STRAIGHT BAR AND FLAT BED KNITTING MACHINES
Raymond Blood, Shepshed, Loughborough, and Rae Lawrence Duthie, Kirby Muxloe, Leicester, England, assignors to William Cotton Limited
Filed July 22, 1968, Ser. No. 746,381
Claims priority, application Great Britain, July 25, 1967, 34,109/67
Int. Cl. D04b *15/66*
U.S. Cl. 66—154
9 Claims

ABSTRACT OF THE DISCLOSURE

In a straight bar or flat bed knitting machine adapted for programme control of selvedge fashioning by use of a main punched chart programming means such as disclosed in U.S. Pat. No. 3,141,316 and not including in this means control means for loop transfer patterning, the combination with said main programming means of auxiliary programme means for control of loop transfer patterning by use of an auxiliary punched chart which is started by a signal from the main punched chart, relevant parts of the main programming means, including a course counting break switch, a speed control, and a main cam shaft shogging solenoid, being connected by relay and switch control circuits, to a solenoid for propping out selvege racking mechanism when patterning is required, pattern selection control mechanism, and solenoids for control of racking of an auxiliary or pattern punched chart which operates the pattern selection control mechanism for patterning and which is self-stopping, so that patterning can be changed without changing fashioning and vice versa.

---

This invention relates to an improved programming control system for straight bar and flat bed knitting machines, the straight bar machine being of the type having a row of needles operable in unison, and in some straight bar machines independently, by stitch cams, and having a narrowing machine with loop transfer points and operable, together with the needles, with dipping motions by fashioning cams for selvedge fashioning by loop transference under control of adjustable selvedge racking mechanism, and the flat bed machine being of the type having a row of needles independently operable by stitch cams, and which is also adapted, by incorporating a narrowing machine having dipping motions by fashioning cams, and adjustable selvedge racking mechanism, for selvedge fashioning.

In the straight bar type or kind of machine the stitch and fashioning cams are alternatively rendered effective, by operation of a cam-controlling device and a rack-controlling device is operable for controlling the adjustable selvedge racking mechanism. For the purpose of programme controlling particularly the selvedge fashioning by the machine, the cam-controlling device which instigates the dipping motions of the narrowing machine, and the rack-controlling device which controls the adjustable selvedge racking mechanism, are operated when required under control of a main programming punched chart. Such an arrangement is disclosed in our Pat. No. 960,816 and it is characterized by having, briefly, a courses counter for controlling numbers of knitted courses, and fashions counter for controlling numbers of selvedge fashionings, together with re-setting means for the courses counter for automatic repeat of a courses and fashions sequence from courses and fashions information provided by holes in the punched chart for which purpose certain rows of the holes include both courses and fashions holes of predetermined coded numerical values so that the punched chart is of particularly short length.

This type or kind of machine is also adapted for patterning by the narrowing head having loop transfer patterning points for co-operating with the needles by causing dipping motions of the narrowing machine, as for selvedge loop transfer fashioning, and by having a pattern selection control device for controlling selection of the patterning points e.g. for lace patterning, cable stitch patterning, or drop stitch patterning.

For the purpose of programme controlling this loop transfer patterning in addition to programme controlling the selvedge loop transfer fashioning, the cam-controlling device for instigating the dipping motions together with the rack-controlling device for the selvedge racking mechanism and additionally the pattern selection control device for the patterning points have heretofore been operated when required under control of the same main punched chart, and since the patterning involves operations of the fashioning cams for the dipping motions which are also required for selvedge fashioning, the punched holes for controlling the patterning has been provided in rows additional to those provided for controlling the selvedge fashioning according to our Pat. No. 960,816. The result is that the main punched chart can become of undesirably long length, and when a change has been required in either the selvedge fashioning or the patterning or both it has been necessary to change the existing punched chart for an entirely fresh punched chart in which the selvedge fashioning holes or the patterning holes or both are differently arranged.

An object of the invention is to avoid the necessity for an undesirably long punched chart and to provide punched chart programming means of such improved construction as will enable the machine to be readily adapted for any arrangement of selvedge loop transfer fashioning with any arrangement of loop transfer patterning, by use of loop transfer points, without having to change the existing composite punched chart for an entirely fresh composite punched chart when changes are required in either selvedge fashioning only or patterning only.

The invention provides, in a straight bar or flat bed knitting machine having a narrowing head carrying selvedge fashioning loop transfer points operable for selvedge loop transfer fashioning under control of a main punched chart programming means, patterning means comprising patterning loop transfer points capable of being brought into and out of operative position in the narrowing head and operable for loop transfer patterning under control of an auxiliary punched chart programming means. Conveniently control means are provided inter-associated with the main and auxiliary punched chart programming means for obtaining fashioning operations by the fashioning loop transfer points at the selvedges and patterning operations by the patterning loop transfer points at locations intermediate the selvedges in the same and different courses. Conveniently also the main punched chart programming means include counting means for courses and fashionings, and operation of the auxiliary punched chart programming means includes interrupting the counting means. The auxiliary punched chart programming means may be started by a signal from the main punched chart programming means and stopped by a signal from itself. The fashioning loop transfer points are under sideways displacing control of fashioning adjustable lead screw racking mechanism, and this mechanism together with patterning adjustable lead screw racking mechanism for sideways displacing control of the patterning loop transfer points, are under control of the auxiliary punched chart programming means for operations of the two mechanisms in the same and different courses. For each patterning which can be repeated a required number of times in the same course under control of the auxiliary punched chart programming means the fashioning adjustable lead screw mechanism is rendered ineffective. For instances where a selvedge fashioning is required for the same course as one or more patternings, the fashioning may be effected before or after patterning, or at the same time as a first patterning, or at the same time as a last patterning, or at the same time as any other patterning, under control of the auxiliary punched chart programming means.

The invention also provides, in a straight bar or flat bed knitting machine, fashioning and patterning means comprising, a narrowing head having fashioning loop transfer points and patterning loop transfer points, a fashioning adjustable lead screw racking mechanism, a patterning adjustable lead screw racking mechanism, a main punched chart programming means including, for controlling fashioning frequencies, counter means for counting courses and fashionings, a fashions solenoid for instigating fashioning motions of the machine, and first control means for the fashioning adjustable lead screw racking mechanism, and an auxiliary punched chart programming means including, for controlling loop transfer patterning, racking means for the punched chart under starting control of the main punched chart and under stopping control of itself, reader means for operating a selection control unit for the patterning, adjustable lead screw racking mechanism, and second control means for interrupting the counter means of the main punched chart programming means, and for operating the first control means to render the fashioning lead screw racking mechanism ineffective. The main punched chart programming means includes speed control means to reduce the machine speed for fashioning, and the same speed control means is under similar control of the auxiliary punched chart programming means to similarly reduce the machine speed for loop transfer patterning. Conveniently the fashions solenoid and solenoids for the first control means for the fashioning adjustable lead screw mechanism and for the racking mechanism for the auxiliary punched chart are rendered operative by relay contacts of a system which includes relays for the speed control and interruption of the counter means and which is under control of the auxiliary punched chart and reader means therefore and of machine operated timing switches.

The above and other features of the invention set out in the appended claims are incorporated in the arrangements, which will be hereinafter particularly described as specific embodiments with reference to the accompanying drawings, in which:

Figure 1:
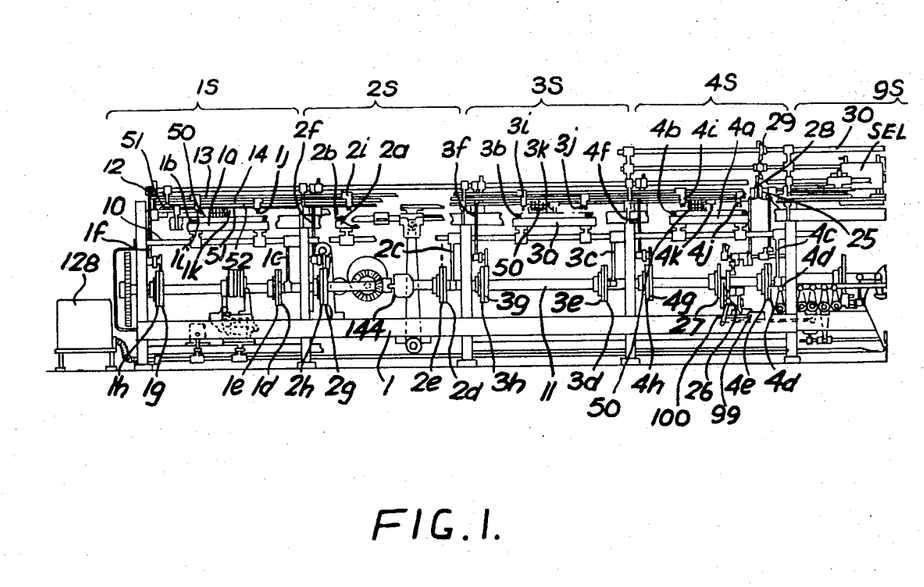
FIGS. 1 and 1a are general front views of a straight bar knitting machine according to the invention.
Figure 1A:
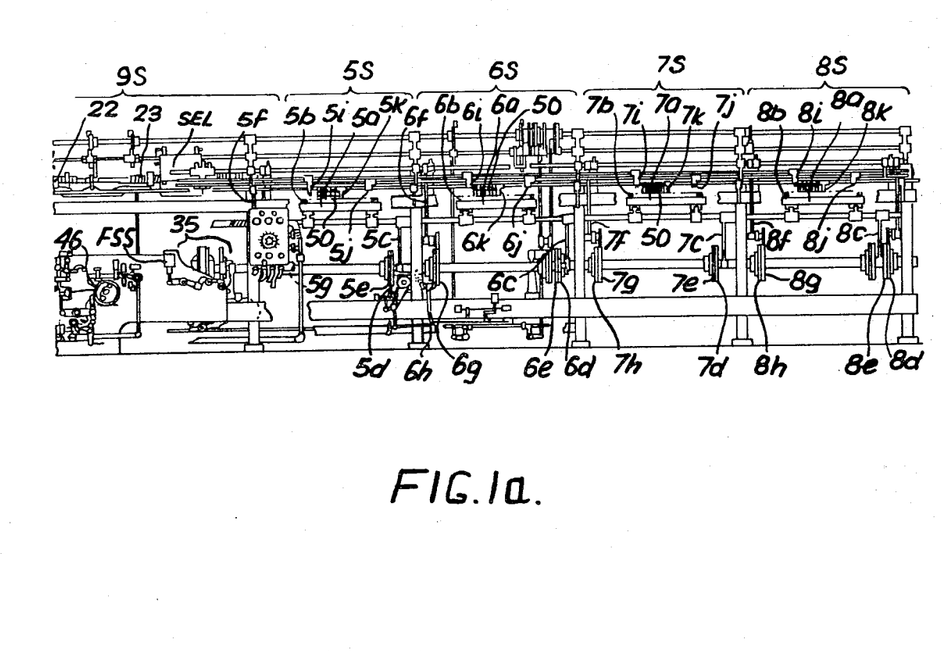

Referring to FIG. 1 the straight bar knitting machine shown is substantially as disclosed in our Great Britain Pat. No. 960,816 to which reference is directed for full details.

MACHINE MECHANISM FOR FASHIONING

Figure 2:
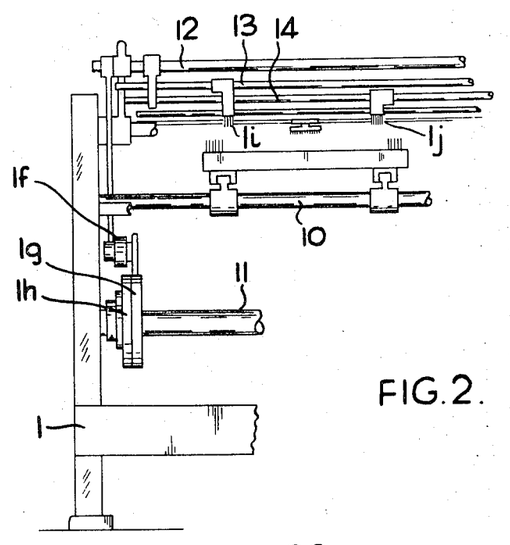
FIG. 2 is a detail front view of part of a narrowing head in the machine.

Briefly the machine is basically of conventional character having a frame 1 forming a plurality of sections 1S to 9S of which the central section 9 is a control section and the remaining sections are formed into knitting sections by needle bars 1a–8a, mounted on a shaft 10, of bearded needles 1b–8b operated by usual cam follower levers 1c–8c and knitting cams 1d–8d on the machine's main cam shaft 11. Thread carriers such as 1k, and 3k to 8k are operated by usual draw mechanism 144 and are under control of usual fashioning adjustable lead screw racking mechanism comprising selvedge stops SEL which are displaceable by lead screws 22, 23 being rotated by usual racking means, see also FIG. 3, 25, 26, 27 under control of rack control elements 28, operated by a control disc 29 on the top disc shaft 30. The machine also has the usual narrowing head 12, see also FIG. 2, to which no motion is imparted for knitting by cam followers 1f–8f and circular cams such as 1g to 4g and 6g to 8g on the shaft 11. This narrowing head 12 carries selvedge fashioning loop transfer points 1i–8i and such as 1j and 3j to 8j on point bars 13, 14 respectively which are endwise displaceable by, in this instance, the same adjustable selvedge stops SEL that displaces the thread carriers. It is known for there to be an alternative in which fashioning adjustable lead screw racking means for the fashioning loop transfer points are provided separate from the racking means for the thread carriers. For fashioning by the fashioning loop transfer points 1i–8i and 1j–8j the cam shaft 11 is shogged endwise by known slogging cam mechanism indicated generally at 35 to cause the fashioning cams 1e–8e for the needles and such as 1h to 4h and 6h to 8h for the narrowing head 12, to operate on the cam followers 1c–8c for the needles and 1f–8f for the narrowing head 12. This causes a fashioning motion of the needles and dipping motions of the narrowing head. Also for fashioning, the rack control elements 28 are operated for sideways displacements of the fashioning loop transfer points in usual manner.

MAIN PROGRAMMING MEANS FOR FASHIONINGS

Our Great Britain Pat. 960,816 is particularly concerned with the provision of a main punched chart programming means. In the ensuing description references of like elements disclosed in said United States patent are indicated in brackets. There is provided punched chart and electric reader means which is indicated generally in FIG. 1 at 46 [46 FIG. 4] and is arranged in an electric circuit with control switches in the machine and with an electronics controller 128 [128, FIG. 1] whereby fashioning of a blank is automatically controlled. Fashionings are effected by the programmed control of a fashions solenoid FSS [FSS FIGS. 1, 4] for operating the cam shaft shogging mechanism 35, [35 FIG. 1] which puts the machine into the required fashioning motion, and also by the programmed control of the top disc shaft 30 [30, FIG. 6] for operating the rack control elements 28 which controls the direction and extent of sideways displacements of the fashioning loop transfer points. For the purpose of the present invention it is sufficient to further explain only with reference to FIG. 7 [FIG. 13b] that (a) the fashions solenoid FSS is operated, for fashioning, through the intermediary of relay contacts FSR/1 [CRSF1], and FSR/2 [CRSF2] operated by a relay in the main system, to close circuit, through a cam operated timing switch SW3 to cause operation of a relay FR [CRF] whose contacts FR/1 [CRF1] hold the relay operated and whose contacts FR/2 [CRF2] hold the solenoid FSS operated, (b) relay contacts FR/3 [CRF3] cause operation of a speed control relay FSCR [no equivalent] for reducing the machine speed for fashioning, under control of a cam operated timing switch R1, and under retaining control of relay contacts FSCR/3, and (c) a count break relay CBR [CRB] is de-energized by opening of relay contact FR/5 [CRF5] whereby relay contacts CBR/1 [CRB1] are opened to break circuit to courses and fashions count switches CCS, FCS [CC–3, FIGS. 13a, 16] so that operations of the counters is interrupted.

MACHINE MECHANISM FOR PATTERNING

Figure 4:
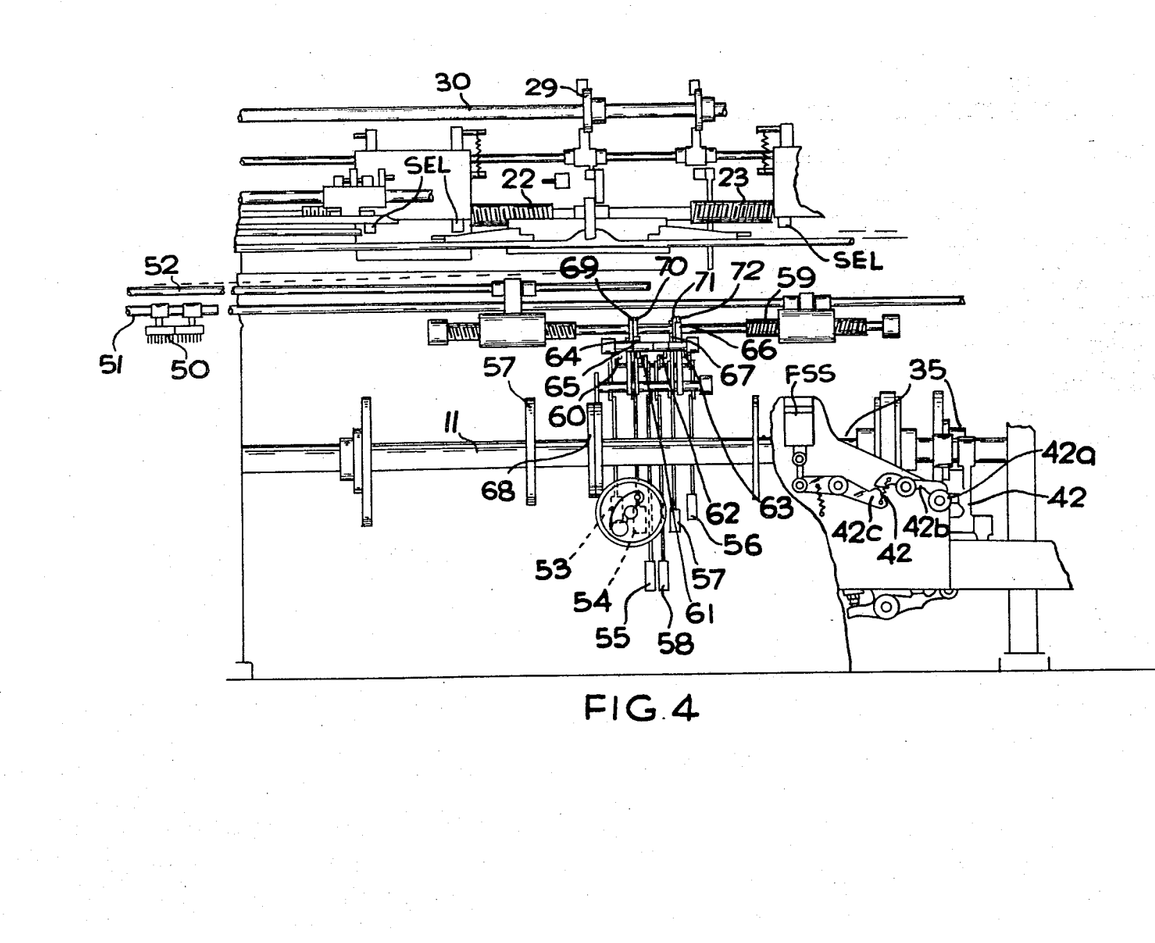
FIG. 4 is a detail front view of main punched chart programming means and patterning adjustable lead screw racking and control means in the machine.

For the purpose of patterning according to the present invention there is provided, in the narrowing head of the machine, lace patterning loop transfer points 50, FIG. 4, in this instance on only one rod 51 close to another rod 52, which may similarly have lacing points on it if required. These lace points 50 are manually pivotal on the rod 51 between an inoperative upwardly directed attitude and an operative downwardly directed attitude. As shown in FIG. 4, the rod 51 is connected to patterning adjustable lead screw racking mechanism under control of a plurality of solenoids 53 to 58 to determine sideways displacements of the lacing points 50 to suit the pattern required. Since the control mechanism between the solenoids 53 to 58 and the lead screw 59 can be of any suitable construction and does not constitute part of the invention it is sufficient to explain that in the illustrated arrangement the solenoids 53 to 58 control horizontal displacements of four bars 60 to 63 to which are connected four pawls 64 to 67 respectively; these pawls are operated by a cam 68 on the cam shaft 11, and they are arranged to co-act with shaped control plates to have different lengths of effective strokes on ratchet wheels 69 to 72 respectively; these ratchet wheels 69 to 72 are oppositely toothed in pairs and are connected to the lead screw 59 so that by suitable selective operation of the solenoids 53 to 58 the lead screw can have imparted to it rotations in either direction and to required different extents. By this means the lacing points 50 can be given sideways displacements in either direction to extents of different needle distances. The rod 52 can be similarly controlled by similar mechanism.

AUXILIARY PROGRAMMING MEANS FOR PATTERNING

Figure 5:
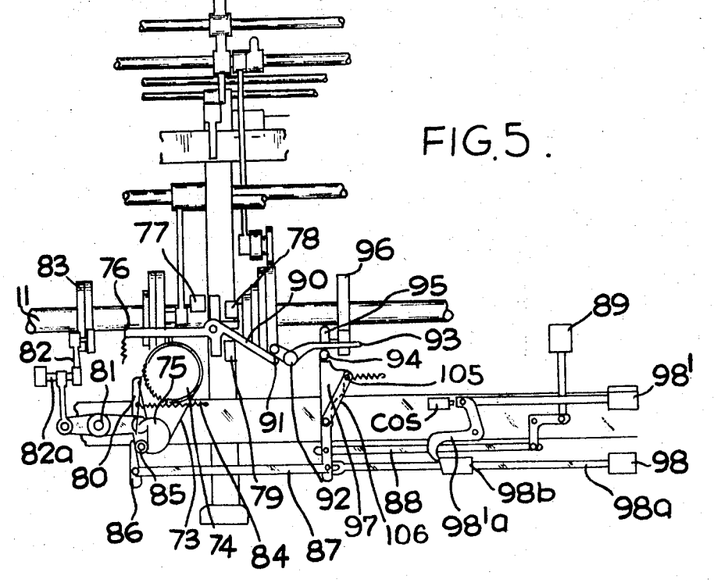
FIG. 5 is a detail front view of auxiliary punched chart programming means in the machine.

For patterning, the solenoids 53 to 58 are selected by an auxiliary punched chart programming means as shown in FIG. 5. A suitably punched chart 73 is mounted on a drum 74 and on a roller 75 and it operates feelers such as 76 controlling feeler switches 77 to 79. The drum 74 is under racking control of a pawl 80 which is mounted on a lever 81 one end of which is connected to a bell crank cam follower lever 82 pivoted on pivot 82a and engaging a cam 83 on the shaft 11 so that the pawl 80 is continuously racked once per revolution of the shaft 11. The pawl is biased by a spring 84 towards engagement with the ratchet wheel on the drum 74 and a tail part has a peg 85 disposed alongside a pivoted prop 86 which is connected by arms 87, 88 to a solenoid 89 and by a link 98a to a solenoid 98. The feelers 76 have tail parts 90 on which bears a rod 91 on a rocking lever 92 which has a tail part 93 overlying a tail part 94 of a cam follower 95 engaged by a cam 96 on the shaft 11. For controlling displacements of the feelers into and out of operative position there is a pivoted prop 97 which is connected to the solenoid 98 for displacing the prop 97 into and out of position under the cam follower lever 95. Timing of removal of the prop 97 is occasioned by weight of the lever 95 normally holding the prop engaged until the cam 96 moves the lever 95 to the prop. The solenoid link 98a has on it a keeper block 98b normally engaging behind a bell crank latch 98'a which is connected to a solenoid 98' and co-operates with a change over switch COS.

The three solenoids 89, 98 and 98' are under control of switch means, in a manner to be hereinafter fully described, including a starting switch PSS, FIG. 7, which is operated from holes at suitably spaced locations in the main punched chart, and also including stopping switch PCS which is operated from a hole at the end of a pattern sequence of holes in the auxiliary punched chart 73.

Figure 3:
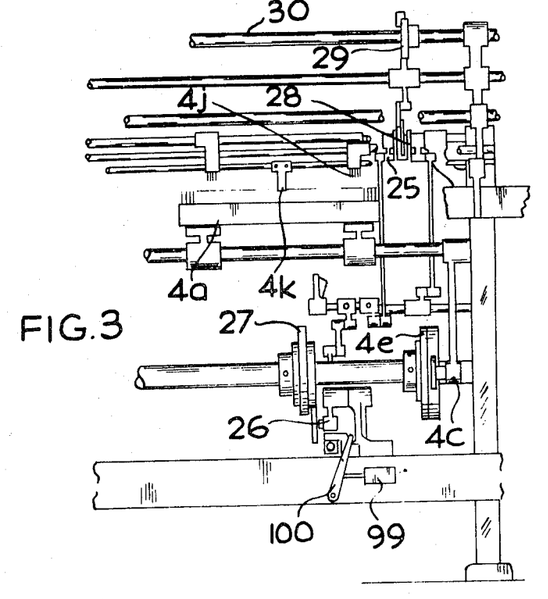
FIG. 3 is a detail front view of fashioning adjustable lead screw racking mechanism in the machine.

Since when patterning there are times when it is not required to fashion, a solenoid 99 FIGS. 1, 3, is provided connected to a pivoted prop 100 for moving the latter into position under the cam follower lever 26 to prop out operation of the fashioning lead screw racking mechanism 25 so that sideways displacement of the fashioning loop transfer points is not effected.

By the means as thus far particularly described it is required for the main punched chart programming means to provide for control of shaping of a blank by controlling fashioning and the auxiliary punched chart programming means to provide for control of lace patterning of the blank and particular requirements of this control are that in certain courses there will be fashioning without patterning, in other courses there will be fashioning and one or a plurality of patterning operations, and in further courses there will be patterning without fashioning.

GENERAL LAYOUT OF FASHIONING AND PATTERNING CONTROL MEANS

Figure 6:
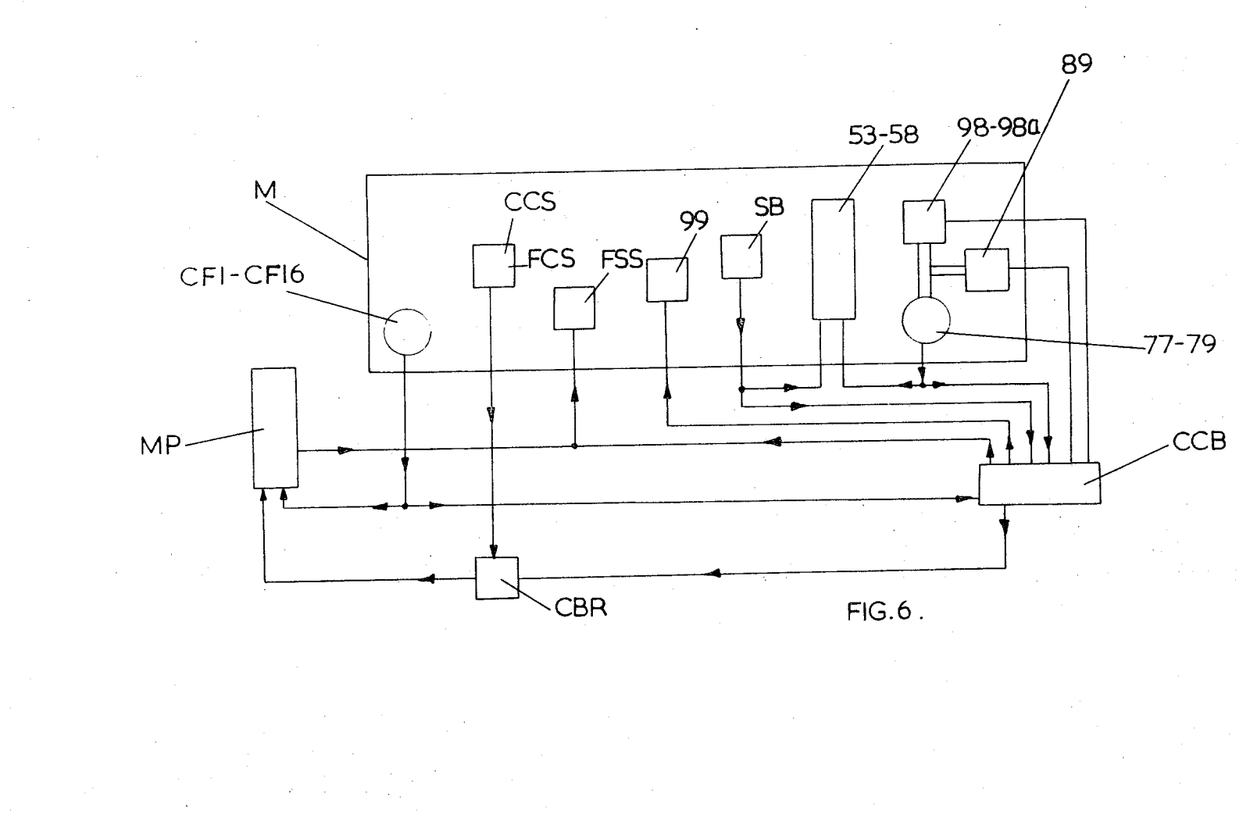
FIG. 6 is a block circuit diagram of main and pattern programming control means according to the invention in relation to a straight bar knitting machine.

The overall control means is generally illustrated in block form in FIG. 6 in which the machine is represented at 'M' and a major part of the main punched chart programming means is represented at MP. Further included parts of the main programming punched chart programming means are the main reader feeler switches CF1–CF16, the count break switch CBR and the fashioning solenoid FSS. Also included are courses and fashions count switches CCS, FCS, the solenoid 99, and 99' if required, FIG. 7 for the fashioning lead screw racking mechanism, a switch box SB of swiches for pattern control, the solenoids 53 to 58 for pattern selection, the solenoids 89, 98, 98' for controlling the auxiliary punched chart programming means, the feeler switches 77 to 79 for the auxiliary punched chart, and control circuits represented by block CCB.

DETAILED ELECTRICAL CONTROL MEANS

Figure 7:
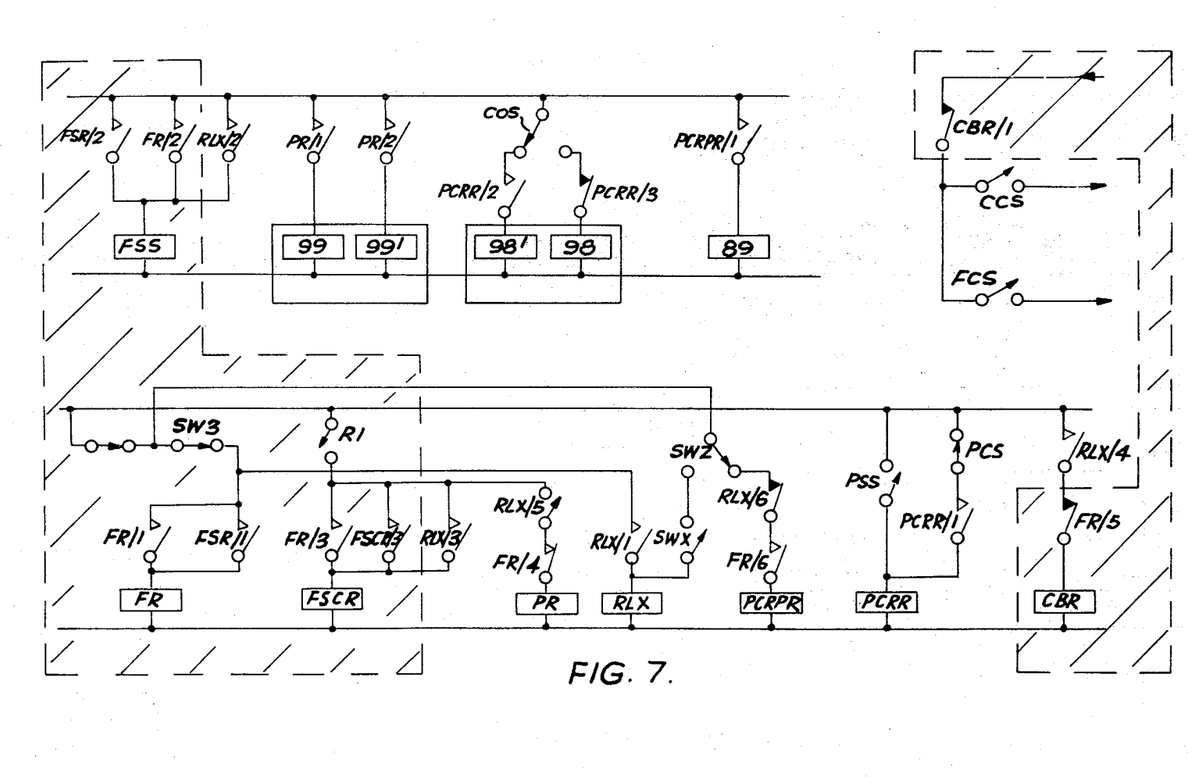
FIG. 7 is a circuit diagram of relevant parts of the programming control means.

In the circuit diagram, FIG. 7, the main programming control means of said patent is represented only by a number of components which are particularly relevant in relation to the lace pattern control, reference being directed to said patent for full details of these and if required for details of the remaining components of the main programming control. The particularly relevant components are mainly those hereinbefore referred to and they are arranged as shown in (a) a main shog control circuit (b) a machine speed control circuit, and (c) a count break control circuit. In the main shog control circuit are the fashions slave relay contacts FSR/1, FSR/2, the fashions relay FR, having associated contacts FR/1–6, the machine fashions cam operated switch SW3, a finger screw safety switch FSSS, and the fashions or shog solenoid FSS. In the machine speed control circuit are the speed control relay FSCR with associated contacts FSCR/3, and a machine cam operated switch R1. In the count break control circuit are the count break relay CBR with associated contacts CBR/1, and the courses and fashions count switches CCS, FCS.

For the purpose of the present invention there is added, as shown in FIG. 7, (d) a patterning shog control circuit, (e) a selvedge prop control circuit, and (f) a pattern feeler and racking control circuit. In the patterning shog control circuit are a shog relay RLX, having associated contacts RLX/1–6, together with machine cam operated timing switches SWX, SW3 and a pattern chart feeler switch SWZ operable from holes in the punched pattern chart. In the selvedge prop control circuit are a prop relay PR with associated contacts PR/1–2, the prop solenoids 99 and 99', if included, and the switch R1. In the pattern feeler and racking control circuit are a pattern rack relay PCRR and associated contacts PCRR/1–3 start and stop switches PSS, PCS (the latter normally closed), a prop relay PCRPR, and contacts PCRPR/1, the solenoids 89, 98, 98', the contacts FR/6, RLX/6 and the switch SWZ.

STARTING OF PATTERNING CONTROL MEANS

The main punched chart has a pattern start hole in each position along the chart corresponding to that distance along the knitted blank at which it is required to start a pattern routine. These holes cause closing of the pattern start switch PSS, FIG. 7, which causes operation of relay PCRR to close its contacts PCRR/1 for retaining, to close its contacts PCRR/2 and to open its contacts PCRR/3. The closure of contacts PCRR/2 causes the pattern card rack start solenoid 98' FIGS. 5, 7, to be energized through the normally closed contact of the change-over switch COS the solenoid then raising the bell crank latch 98'a which releases the linkage 98a associated with solenoid 98 and operating the switch COS thereby de-energizing solenoid 98'. The bell crank latch 98'a is held up by the keeper block 98b moving under it so that the switch COS remains operated and the linkage 98a remains in its released position whereat a peg 105 on an arm 106 is moved away from the prop 97 which however remains operative by cam pressure on the follower lever 95. Eventually the cam 96 releases pressure on the follower lever 95 which allows for spring release of the prop so that the feelers 76 can be operative. Also in the release position of the linkage 98a, 87, 86, the reciprocating pawl 80 is spring engaged with the drum's rack wheel to start racking the drum 74 which will continue for patterning. When the switch PCS on the pattern card opens at the end of a lacing programme, the hold circuit to relay PCRR is broken and this relay is de-energized, solenoid 98 is energized, through contacts PCRR/3 and the change-over switch COS, and pulls its associated linkage 98a to disengage the pawl 80 from the drums rack wheel and stop further card racking. The bell-crank latch 98b falls to hold the keeper 98b and releases the change-over switch COS de-energizing solenoid 98. The solenoid 89 is provided so that normal continuous racking of the pattern card drum 74 may be interrupted (by link 88 and arm 106 causing peg 105 to re-engage prop 97 under follower lever 95 to hold feelers 76 inoperative) when a selvedge fashioning only is required. This solenoid 89 is energized by operation of the relay PCRPR through its contacts PCRPR/1, and this relay is energized through the contacts FR/6 of the fashions relay and RLX/6 of the lacing relay and the feeler switch SWZ, which combination will provide a circuit only when a selvedge fashioning is required without a simultaneous lacing operation.

The pattern chart 73 has one row of holes per revolution of the machine cam shaft and in one of a plurality of columns of holes there is a "fashion" hole which signifies that the cam shaft is required to be shogged for a "fashioning" motion of the machine, which is necessary for lacing patterning, during the next cam shaft revolution. These "fashion" holes are located in the or each row before the or each first row of one or more series of rows of "lacing" holes in the chart.

PATTERNING WITHOUT FASHIONING

Assuming now that lace patterning only is required i.e. without fashioning. Assuming also that a pattern start hole in the main punched chart has caused energizing of the pattern card rack start solenoid 98', as hereinbefore described to thereby start racking of the pattern chart. When the first rack has been made by the cam 83 operating pawl 80, a "fashion" hole in the pattern chart causes its feeler switch SWZ FIG. 7 to make contact with one side of a cam operated switch SWX which is timed to close after completion of a courses count pulse in the main punched chart programming means. This causes a relay RLX to operate closing its contacts RLX/1 to retain and closing its contacts RLX/2 to energize the fashions solenoid FSS for putting the machine into a fashioning motion. Also contacts RLX/3 close to operate the speed control relay FSCR to reduce the machine speed under timing control of the cam operated switch R1, and contacts RLX/4 close to operate through normally closed contacts FR/5 the count break relay CBR whose contacts CBR/1 open to open the circuit to the courses and fashions switches CCS, FCS to break the counter operations of the main punched chart programming means during the ensuing lace patterning. Furthermore the solenoid 99, and 99' if fitted, is energized through (a) contacts FR/4 being closed because of one fashioning instruction, (b) contacts RLX/5 being closed from lacing instruction by switches SWZ and SWX, and (c) timing cam operated switch R1 causing relay PR to energize closing contacts PR/1, and PR/2 if provided. This solenoid 99, (99') thereupon operates the prop 100 FIG. 3, to prop out the selvedge fashioning racking mechanism 25–27 since selvedge fashioning is not required. When the machine has gone into the fashioning motion, the pattern chart has racked on for a row of lacing holes to selectively operate the feeler switches 77 to 79 FIG. 5 during the first of the usual two dipping motions of the narrowing head. The selected feeler switches 77 to 79 selectively operate the lace control solenoids 53 to 58, FIG. 4, whereby the lacing points 50 are sideways displaced in required lace patterning manner. If only one lacing operation is required then there will not be a "fashions" hole in the row and on the next rack of the punched chart the machine will revert back to the knitting motion by de-energizing of the fashions solenoid FSS so that the cam shaft shogs back. If a plurality of lace patterning operations are required in the same course, there will be a "fashions" hole in each of a plurality of rows of lacing holes to prepare for a fashioning motion of the machine for each next row of lacing holes. In the last row of "lacing" holes for the required number of patterning motions there will not be a "fashions" hole so that solenoid FSS will be de-energized and the cam shaft will shog back to the knitting motion for the machine.

Figure 8:
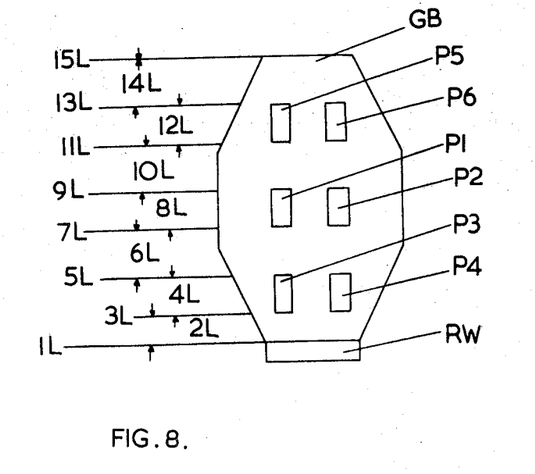
FIG. 8 is a diagrammatic illustration of fabric shaped and patterned under control of the programming control means.

Lace patterns produced by the means just described, i.e. in the instance where there are no selvedge fashionings, are represented for example by the blocks P1, P2, FIG. 8 in the garment blank GB. This figure illustrates that the blank may be started with a rib welt RW which may be pre-formed and run-on at location 1L to the machine's needles, during which time the pattern chart is inoperative. Then follows a group of non-patterned courses during which normal selvedge widening is effected, with the pattern chart remaining inoperative. At 3L, the normal, or a special, rack of the main chart advances for a "pattern-start" hole to be read which causes the punched pattern chart to become operative as above described so that lace patterns such as represented by block P3, P4 are formed at 4L, both charts being operative so that selvedge widening is also effected in predetermined courses, at least some of which may be also lacing courses, in a manner to be hereinafter described. At 5L, the pattern chart has advanced for its "pattern-stop" hole to be read by switch PCS so that then a group 6L of non-patterned courses follows, during part of which selvedge widening stops in normal manner. At locations 7L to 11L, and 11L to 15L the circumstances are substantially in repeat of those at the locations 3L to 7L except that at location 8L there is no selvedge fashioning, as hereinbefore described, and at locations 12L and 14L there is selvedge narrowing in normal manner. At location 12L lace patterns P5, P6 are formed, and at 15L there is no further knitting.

PATTERNING AND FASHIONING

In each instance, such as at locations 4L and 12L when there are courses for which lacing instructions coincide with selvedge fashioning instructions from the holes in the respective pattern and main charts, operations of the two charts are timed by cam operated switch SWX so that reading of the lace instruction by feeler switch SWZ will not be effective until after the fashions or shog relay FR, FIG. 7, of the main chart control 1, has been operated to call for shogging of the main cam shaft to put the machine into a fashioning motion or dipping motion of the narrowing machine. Consequently, and contrary to when the patterns P1, P2 are formed unaccompanied by selvedge fashioning, the prop relay PR will not energize when the cam operated switch R1 is closed to operate the relay FSCR, since the relay contact FR/4 will have been opened by the operated relay FR, neither will the count break relay CBR energize to open the count break contact CBR/1 since the relay contact FR/5 will have been opened.

The control system is adaptable to provide for either these simultaneous selvedge fashioning and lacing operations, or sequential performance of such operations, as may be required to suit a simultaneous or sequential method of lacing for which the machine is adapted.

Also, the control system is adaptable to cause a selvedge fashioning to be performed during the first, last or any other selected dipping motion in a sequence of lacing operations. In any dipping motion thus selected selvedge fashioning may preceed the lacing operation or vice versa as desired.

In the instance of there being required a sequence of successive lacing operations these may be performed in similar manner to that described for the patterns P1, P2. During each additional fashioning or shogged motion or dipping-motion of the narrowing machine for the additional lacing, the relay FR will, in this instance, have been de-energized so that the prop solenoids 99, and 99' if provided, and the count break relay CBR will be energized, cancelling out the selvedge racking and the counting operations, as before.

FASHIONING WITHOUT PATTERNING

In instances such as at 1L, 14L, and at times within the lengths 4L, 12L, FIG. 8, when selvedge fashioning is required without accompanying lace patterning, the main punched chart will operate normally so that relay contacts FSR/2 close causing operation of the fashions solenoid FSS for shogging the cam shaft to cause fashions motion of the machine, and relay contacts FSR/1 close to cause operation of the relay FR. Closed contacts FR/3 of the relay FR operate the speed control relay FSCR which reduces the machine speed, all as described hereinbefore and in our Pat. No. 960,816. Also the prop solenoid 99, and 99' if provided, for the fashioning lead screw racking means 25, 27 is de-energized by contacts RLX/5 open so that the prop 100 is idle for the racking mechanism to operate in usual manner for fashioning. Further the pattern control solenoids 89, 98, 98' are de-energized so that the auxiliary punched chart programming means is inactive. It will thus be seen that the auxiliary punched chart programming means for patterning is completely independent of the main punched chart programming means for fashioning and is therefore not tied to any particular sequence of selvedge fashionings.

It will be understood that by employment of the auxiliary punched chart programming means for patterning in conjunction with the main punched chart programming means for fashioning, this enables the use of two comparatively short charts instead of an undesirably long chart, and a single "pattern" control chart can be used with a range of different "fashion" control charts thus providing for changes in the size and/or shape of garment blanks all with the same pattern. Where the pattern is repeated at lengthwise intervals in the length of the garment blanks, only one "pattern" control chart is necessary. Conversely there can be employed with any given "fashion" control chart a range of different "pattern" control charts, assuming that the pattern is not too long for the "fashion" control chart to maintain starting control, in repeat if required, of the pattern chart.

It is also to be understood that whereas the hereinbefore particular description is in respect of lace patterning, the pattern control can be adapted for use in respect of forms of patterning other than lacing, such as cable or drop stitch patterning.

Although in the system hereinbefore particularly described the control is basically of electric type it is to be understood that the control can be alternatively effected wholly or in part by mechanical means, in which expression is included hydraulic and pneumatic means, various components of the system being substituted by their mechanical equivalents.

What we claim is:

1. In a knitting machine, means for knitting courses of flat selvedged fabric blanks, said machine having a rotary cam shaft with shogging means for displacing it between knitting and fashioning positions, means for fashioning the selvedges of said blanks including a fashioning lead screw, means for turning said lead screw for narrowing and widening at said fabric selvedges, first pattern control means for controlling said knitting and fashioning means including a first pattern device, first indexing means for said pattern device, and control means for determining frequency of fashioning in knitted courses, the improvement comprising means for patterning said blank including a pattern-forming means, a second pattern control means for controlling said patterning including a second pattern device, second indexing means for said second pattern device, means for activating said second indexing means from said main pattern device, means for inactivating said control means and controlling said shogging means together with said fashioning lead screw from said second pattern device, means for activating said pattern-forming means from said second pattern device, and means for inactivating said second indexing means from said second pattern device.

2. In a knitting machine, the combination, with means for changing between knitting and fashioning modes and fashioning adjustable lead screw mechanism, of first programming means including a first programming device and associated courses and fashions control means for controlling numbers of courses and frequency of fashioning loop transfer patterning means and second programming means including a second programming device and associated selection control means for controlling said loop transfer patterning means, relay and solenoid control means associated with said first and second programming means and comprising a first relay and solenoid control for said first programming device to instigate operation of said second programming device, a second relay and solenoid control for said second programming device to instigate change of the machine to fashioning mode, and a third relay and solenoid control for said fashioning adjustable lead screw mechanism, a first relay control for said second programming device to interrupt said courses and fashions control means, a second relay control for said second programming device to operate said selection control means for patterning, a third relay control for said second programming device to terminate its operation, and means for reverting to operation of said first programming means.

3. In a knitting machine, the combination of, knitting means including a cam shaft with two types of cams and first-solenoid operated shogging means for the shaft, a narrowing head having first loop transfer points connected to a first adjustable lead screw mechanism, second loop transfer points connected to a second adjustable lead screw mechanism, means for operating said narrowing head, second-solenoid operated prop means for idling said first adjustable lead screw mechanism, first programming means with counting means for control of numbers of courses and fashionings and frequency of the latter count break means for said counting means, second programming means with third-solenoid operated indexing means, and a relay system including a plurality of relays for operating said solenoids including for energizing said third solenoid from said main programming means for starting said second programming means, also for energizing from said second programming means said first and second solenoids for shogging said cam shaft and idling said first lead screw mechanisms and further for operating said count break means, said second adjustable lead screw mechanism being under control of said second programming means, and said third solenoid being also under control of said second programming means.

4. In a knitting machine for knitting courses including loop transfer fashioning and loop transfer patterning, the combination, of a shogging cam shaft operable by first solenoid means to change the machine between knitting and loop transfer positions, a first adjustable lead screw to provide for loop transference in opposite directions for fashioning, prop means operable by second solenoid means for rendering said first lead screw mechanism ineffective, a second adjustable lead screw for loop transfer patterning, first programming means including a first programming device including courses and fashions control means for controlling numbers of courses and fashionings, break means for interrupting said courses and fashions control means, and second programming means comprising a second programming device with indexing means operable by third solenoid means, and a relay system including first relay means under control of said main programming device to operate said third solenoid means for starting said second programming device, second relay means under control of said second programming device for operating said first solenoid to change the machine to loop transfer mode also operating said second solenoid for rendering said first lead screw means ineffective and further operating said break means for interrupting said courses and fashions control means, said second adjustable lead screw and said third solenoid being under control of said second programming means for patterning and stopping said second programming means for terminating patterning.

5. In a knitting machine for knitting courses of flat selvedged fabric blanks, the combination of a rotary cam shaft with shogging means therefor, first solenoid means for rendering said shogging means active and inactive for axail displacement of said shaft between knitting and loop transfer positions, a first lead screw with racking means for adjustment in opposite directions to provide for loop transfer fashioning by widening and narrowing, first programming means including a first indexed programming device and courses and fashions control means for controlling numbers of courses and fashionings, prop means with a second solenoid therefor for independently rendering said racking means effective and ineffective, a second lead screw with racking means for adjustment to provide for loop transfer patterning, a second programming means including a second programming device with indexing means therefor, third solenoid means rendering said indexing means active and inactive, and a relay system including a first relay means under control of said first programming device for operating said third solenoid means to start the second programming device, and second relay means under control of said second programming device for operating said first solenoid to shog said shaft to loop transfer position, also for operating said second solenoid to render said first lead screw mechanism effective and ineffective for patterning without fashioning, patterning with fashioning, and fashioning without patterning, and further operating a break relay for interrupting said courses and fashions control means, said second lead screw mechanism being under control of said second programming device for loop transfer patterning, and said third solenoid being under control of said second programming device for stopping the latter to terminate patterning.

6. In a knitting machine for knitting courses of flat selvedged fabric blanks, the combination of a rotary cam shaft operable for knitting, fashioning means including said rotary cam shaft and adjustable selvedge stop lead screw mechanism, shogging means with a first controlling solenoid means for shogging said rotary cam shaft between knitting and fashioning positions, prop means with a second controlling solenoid means for rendering said adjustable selvedge stop lead screw mechanism active and inactive, main programming means for controlling knitting and fashioning and including a main pattern device, courses and fashions control means for controlling numbers of courses and fashions, said main pattern device, together with said courses and fashions control means, being for the machine to produce required courses and fashionings, break means for interrupting operation of said courses and fashions control means, adjustable patterning lead screw mechanism, and auxiliary programming means for controlling patterning and including an auxiliary pattern device, auxiliary indexing means with a third controlling solenoid means for said auxiliary indexing means, and a relay system comprising an indexing relay under control of the main pattern device for energizing the third controlling solenoid means to start the auxiliary pattern device, a shog relay under control of the auxiliary pattern device for energizing the first controlling solenoid means for shogging the shaft into fashioning position, a break relay energized by operation of said shog relay to interrupt operation of the courses and fashions control means, a prop relay under control of said shog relay for operating said second controlling solenoid means to render said adjustable selvedge stop lead screw mechanism inactive, and switch means under control of said auxiliary pattern device for operating said third indexing solenoid to stop the auxiliary pattern device, and said adjustable patterning lead screw mechanism being under control of said auxiliary pattern device.

7. In a knitting machine for knitting courses of flat selvedged fabric blanks the combination of a rotary cam shaft means for producing knitted courses, fashioning means including cam shaft shogging means and fashioning lead screw control means, main programming means including a main punched chart with associated reader means and indexing means, and courses and fashions counter means, said main programming means being operative to instigate operations of said knitting means, said fashioning lead screw control means, and said counter means, for operations of said knitting means to produce groups of knitted courses, and operations of said fashioning means for fashioning in knitted courses, as predetermined by the main punched chart, patterning means including patterning lead screw and selection control means, additional programming means including an additional punched chart with associated additional reader means and additional indexing means, said reader means being connected to said cam shaft shogging means and said selection control means for patterning as predetermined by the punched chart, and said additional indexing means being under control of said main and additional punched charts, and a relay control system which is connected to and controls, said counter means and said fashioning lead screw control means to provide for the patterning programme being determined by the additional punched chart instead of from the main punched chart.

8. In a straight bar or flat bed kitting machine, fashioning and patterning means comprising, a narrowing head having fashioning loop transfer points and patterning loop transfer points, a fashioning adjustable lead screw racking mechanism, a patterning adjustable lead screw racking mechanism, a main punched chart programming means including, for controlling fashioning frequencies, counter means for counting courses and fashionings, a fashion solenoid for instigating fashioning motions of the machine, and an auxiliary punched chart programming means including, for controlling loop transfer patterning, solenoid operated racking means for the auxiliary punched chart under starting control of the main punched chart and under stopping control of itself, reader means for operating a selection control unit for the patterning adjustable lead screw racking mechanism, and auxiliary control means comprising a relay system under control of the auxiliary punched chart and reader means and comprising relay contacts for said solenoids to control the fashioning adjustable lead screw racking mechanism and the racking mechanism for the auxiliary punched chart relays for interruption of the counter means, and machine operated timing switches.

9. Means according to claim 8 wherein the main punched chart programming means includes speed control means to reduce the machine speed for fashioning, and the same speed control means is under similar control of the auxiliary punched chart programming means through relays in said relay system to similarly reduce the machine speed for loop transfer patterning.

References Cited

UNITED STATES PATENTS

| | | | |
|---|---|---|---|
| 3,141,316 | 7/1964 | McCarthy et al. | 66—154 |
| 3,434,305 | 3/1969 | Bentley et al. | 66—155X |
| 3,435,638 | 4/1969 | Start et al. | 66—155X |
| 3,439,513 | 4/1969 | Hill et al. | 66—155X |

RONALD FELDBAUM, Primary Examiner

U.S. Cl. X.R.

66—155